July 29, 1947.  R. M. HILL  2,424,567

PACKING AND METHOD OF MAKING THE SAME

Filed Dec. 24, 1942

Inventor
Ralph M. Hill
by
Walter & Kaufman
Attorney

Patented July 29, 1947

2,424,567

UNITED STATES PATENT OFFICE 2,424,567

PACKING AND METHOD OF MAKING THE SAME

Ralph M. Hill, Lancaster Township, Lancaster County, Pa., assignor to Armstrong Cork Company, Lancaster, Pa., a corporation of Pennsylvania Application December 24, 1942, Serial No. 470,056

14 Claims. (Cl. 288—4)

My invention relates to packings generally and to a method of making the same and more specifically to joint packings for rotating or oscillating shafts and packings for use in pressure cylinders.

In the art to which my invention relates, one of the primary causes of failure has been the curling of the packing away from the surface to be sealed, thus eventually breaking down the seal and resulting in inevitable failure of the packing for the service intended. This curling or distortion is worst when the packing is subjected to contact with materials having a softening or swelling action thereon. Common examples of this are in cup washers for lubricating equipment pressure cylinders, air cylinders and similar structures where the packing is in contact with oil or grease for long periods of time. In such service, rubber has been found unsatisfactory because it deteriorates rapidly in contact with oily or greasy substances. "Thiokol" and "Neoprene" compositions resist this action better but do swell a perceptible amount after prolonged contact. It has been found that such swelling generally results in a curling of the terminal edge of the packing away from the surface to be sealed. This condition is aggravated where the packing terminates in a relatively thin edge, as is essential in some packing structures in order to obtain an initial seal under low pressure. With such contour, there is insufficient mass at the edge of the packing to hold the body in shape upon swelling and, since sealing pressure is required at this edge, even slight curling of the same away from the surface to be sealed results in failure of the packing. Even with relatively heavy walled packings, however, the same problem exists, but failure will generally not occur until a relatively longer period of use or contact with the material which induces swelling.

According to my invention, the swelling tendency of such materials is availed of, and, by proper control, is utilized to insure a lasting seal under such conditions of use. By proper selection of materials, I can produce a composite joint packing in which a portion of the packing has a swelling factor greater than the swelling factor of another portion and I have discovered that the effect of differential swelling in the two portions will be to bias the packing closer into engagement with the surface to be sealed, and thus, if the packing be formed to effect a good initial seal, this seal will be maintained and perhaps enhanced after operating under conditions which would normally be opposed to the maintenance of a proper seal.

For example, in forming a cup washer for a lubricating gun pressure cylinder, I provide a compound structure wherein that portion of the washer which will engage the cylinder wall will be so compounded as to have a lower swelling factor than an adjacent lamina. Swelling of such adjacent lamina induced by use of a cup washer under conditions which will result in contact of that lamina with oil or grease which will effect swelling, will result in elongation of such lamina, thus causing the terminal edge of the washer to be biased to more closely conform to and engage the cylinder wall, eliminating all tendency toward inward curling and greatly increasing the life of the packing. Obviously, the amount of swelling should be controlled and materials having such a high swelling factor as to deteriorate or distort to too great an extent after a short period of contact with the material which causes such swelling or deterioration should not be used.

In order that my invention will be clear to those skilled in the art, I will describe certain embodiments which will typify my invention.

Figure 1:
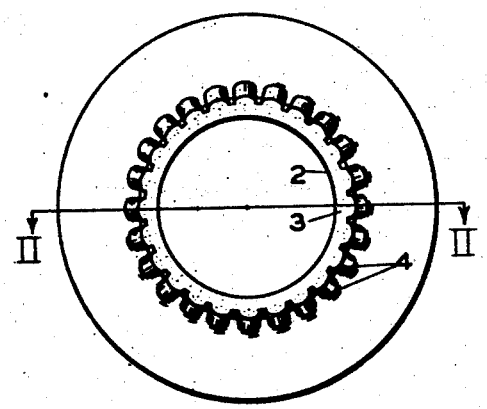
Figure 1 is a top plan view of an oil seal embodying my invention.
Figure 2:
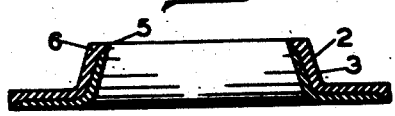
Figure 2 is a sectional view of the seal of Figure 1, taken along the line II—II of Figure 1.

Referring to Figures 1 and 2, the seal comprises an inner lamina 2 for engagement with the surface to be sealed. The character of the composition forming the lamina 2 will depend, of course, upon the service to which the cup washer will be put. It may be formed of rubber, "Neoprene" chlorobutadiene 1,3, "Thiokol" ethylene tetrasulfide, glue-glycerine composition or other compositions useable in the manufacture of seals, cup washers, and packings of this same general character. The lamina 2 preferably has a relatively low swelling factor. A lamina 3 is joined to the lamina 2 and may be formed of substantially the same composition as the lamina 2 but should have a swelling factor greater than the swelling factor of the composition forming the lamina 2. The swelling factor may be conveniently controlled by the proportion of inert material (such as inert fillers) to swellable material in the composition, the swelling factor increasing with the increase in proportion of swellable material, since the filling materials used are preferably inert.

The following formulae illustrate the comparative formulation of the composition for layers 2 and 3. All parts are given by weight.

|  | Lamina 2 | Lamina 3 |
| --- | --- | --- |
| Neoprene | 100 | 100 |
| Factice | 20 | 20 |
| Anti-Oxidant | 2 | 2 |
| Wood Rosin | 5 | 5 |
| Litharge | 20 | 20 |
| Sulphur | 1 | 1 |
| Soft Carbon Black | 125 | 75 |
| Zinc Oxide | 5 | 5 |

It is not essential that the differential swelling be effected by such compounding since a similar result will be attained by utilizing totally different compositions for the layers 2 and 3. I have found it desirable to provide a differential swelling factor in the adjacent layers sufficient that differential linear expansion between the layer 3 having the greater swelling factor, and the layer 2 for engagement with the surface to be sealed will be between about 1 to 5%. The amount of differential linear expansion necessary to attain the desired result will depend, of course, upon the particular service in which the packing is used, including the pressures encountered, the size and the shape of the packing and other variable factors. Selection of material for forming the adjacent laminae will have to be determined in accordance with such variables in each case.

I prefer to form the packing in such manner that the laminae 2 and 3 are integrally joined. This may be accomplished by disposing strips of uncured stock in juxtaposition in a mold and subsequently pressing the same to the desired final shape and curing or vulcanizing. In order to obviate any tendency for the materials to irregularly flow during the molding operation, thus making it difficult to obtain a uniform linear expansion effect, I may partially cure each of the laminae 2 and 3 prior to molding to final shape and by such method I will be able to integrally join the adjacent laminae and at the same time insure a uniform structure. The laminae may be united by an adhesive or mechanically joined. The essential prerequisite is to provide a structure in which there is a differential swelling resulting in controlled differential linear expansion of one of the lamina, such lamina being joined to an adjacent lamina in such manner that the linear expansion of the first mentioned lamina will induce a movement of, or bias such lamina into engagement with the surface to be sealed.

As heretofore pointed out, the lamina adjacent the surface to be sealed may be so compounded as to have no substantial swelling action when subjected to the conditions of use and be laminated with a lamina compounded to have a definite swelling factor. Particularly where both laminae are swellable, it has been found desirable to utilize an extraneous bonding agent in addition to the composition which is affected to cause swelling. For example, with a "Neoprene" composition employed in both layers, I have found it desirable in some services to add an extraneous binder of phenol aldehyde resin such as "Bakelite" which is substantially inert to the actions of oils and greases. With such composition, the laminae may be formulated as follows; all parts being given by weight:

|  | Lamina 2 | Lamina 3 |
| --- | --- | --- |
| "Neoprene" | 100 | 100 |
| Wood Rosin | 5 | 5 |
| Commercial Calcined Magnesium Oxide | 10 | 10 |
| Zinc Oxide | 10 | 10 |
| Phenol Aldehyde Resin | 100 | 67 |
| Soft Carbon Black | 100 | 100 |

With such structure, the molding temperature must, of course, be elevated sufficiently to effect vulcanization of the "Neoprene" and conversion of the phenol aldehyde resin binder into the infusible stage. This is accomplished while the laminae are in face to face contact in the mold under pressure so that, upon vulcanization of the "Neoprene" and setting or conversion of the "Bakelite" binder, a permanent bond is obtained therebetween which is not materially affected upon swelling of the "Neoprene" in the composition.

Figure 4:
Figure 4 is a side elevation of the oil seal shown on Figures 1 and 2.

It will be noted in Figures 1 and 4 that the outer layer 3 which has the greater swelling factor may be molded so as to have a series of vertically directed flutes or ribs 4 which serve to increase the surface area of the outer layer 3 exposed to the action of the material which will induce swelling. It has been found that the provisions of such ribs or similar formations which increase the surface area in the zone of the edge where sealing is to be effected greatly improves the biasing action and insures a good seal under most severe working conditions. In place of ribs or flutes, other surface contours may be formed in the body such as rugosities, pips or the like which will provide the layer 3 with an outer surface presenting an enlarged area for contact with the solvent material which induces swelling. By providing ribs which are longer than they are wide and by disposing them axially of the packing, the swelling will be greater in a longitudinal direction than in a direction at right angles to the surface to be sealed or the axis of the packing. This will cause a lengthening of the outer layer at the ribs and will bias the inner layer into engagement with the surface to be sealed. This obviates the problem now encountered where swelling of oil seals of this sort results in an increase in the internal diameter of the packing and a consequent diminution of the sealing force until complete failure of the seal occurs. By this invention the swelling is directionally controlled and its effect availed of to bias the sealing layer toward the surface to be sealed.

As shown in Figure 2, the leading edge 5 of the inner layer 2 where the seal is primarily effected may be substantially covered and protected by the outer lamina 3 so that in service the edge 5 will not be subjected to the full effects of open contact with material which might swell the lamina 2. This is particularly desirable where both layers 2 and 3 are made of the same general composition as in the formulae given above. By this same structure, biasing of the fin edge 5 may be enhanced because of the large volume of material in the layer 6 in the vicinity of the edge 5.

Figure 3:
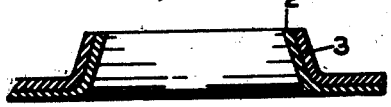
Figure 3 is a sectional view of an oil seal showing a modified sealing wall construction.

Figure 3 illustrates an oil seal of the type contemplated by my invention in which the ribs 4 and edge structure 5 are not provided. For many uses, particularly where only a minor biasing action is necessary, the structure shown in Figure 3 will be acceptable.

The packing of my invention may be embodied in various shapes and for various uses such as oil seals, cup washers, air gun piston cups, and many other uses. It finds particular usefulness in those services where heretofore the action of materials into which it would come in contact in service has resulted in premature failure. In most services, the usual expansion or compression rings or springs used to urge the edge of the packing into engagement with the surface to be sealed may be eliminated.

This application is a continuation-in-part of my copending application, Serial No. 253,972, filed February 1, 1939, and entitled "Packings and method of making the same."

While I have illustrated and described certain preferred embodiments of my invention, it will be understood that the invention is not so limited but may be otherwise embodied within the scope of the following claims.

I claim:

1. A composite packing, such as a cup washer or the like, which is made of a layer of an artificial plastic composition which has some elasticity and which includes a body material which will swell when in contact with a solvent without disintegrating and which will be exposed to the action of such solvent in use joined integrally to a second layer having substantially the same physical characteristics but less tendency to swell when in contact with the solvent and which will engage the surface to be sealed when in use, and an extraneous binder inert to the action of the solvent bonding the body ingredients of each layer and joining the layers together against separation upon differential swelling of the layers, said second layer including a greater volume of said inert binder than the other layer.

2. A composite packing, such as an oil seal, having an inner substantially cylindrical sealing surface formed of a layer of an artificial material which has some elasticity and which includes a body material which will swell when in contact with a solvent without disintegrating and which will engage the surface to be sealed when in use and an outer substantially cylindrical layer integrally joined to the inner layer and having physical characteristics similar thereto but a substantially greater tendency to swell when in contact with the solvent, said outer layer being provided with a series of closely spaced axially extending ribs in its outer surface and thereby presenting an enlarged area for contact with said solvent.

3. A composite packing having a substantially cylindrical sealing surface terminating in a thin, fin edge and formed of a layer of an artificial material which has some elasticity and which includes a body material which will swell when in contact with a solvent without disintegrating and which will engage the surface to be sealed when in use and a second layer integrally joined to the first layer and having physical characteristics similar thereto but a substantially greater tendency to swell when in contact with the solvent, said second layer covering the thin fin edge at all surfaces except that surface for contact with the surface to be sealed.

4. A composite packing which is made of two layers of artificial material integrally joined together, both layers possessing the physical characteristics of elasticity and of swelling when in contact with a solvent without disintegrating but each possessing the latter in different degrees, the layer having the lesser tendency to swell serving as the sealing surface and the other layer being effective for biasing the sealing layer into engagement with the surface to be sealed upon swelling of said other layer, and a synthetic resin binder inert to the action of said solvent integrally bonding the body ingredients of each layer and joining said layers, said layer having the lesser tendency to swell including a greater volume of said inert synthetic resin binder than the other layer.

5. A composite packing which is made of two layers of synthetic rubber integrally joined together, both layers possessing the physical characteristics of elasticity and of swelling when in contact with a solvent without disintegrating, an extraneous binder inert to the action of said solvent integrally bonding the body ingredients of each layer and joining said layers, one of said layers including a greater volume of said binder than the other, whereby said layer having the greater proportion of binder will have a lesser tendency to swell than said other layer, said first mentioned layer serving as a sealing surface and the other layer being effective for biasing the sealing layer into engagement with the surface to be sealed upon swelling of said other layer.

6. In the method of forming composite joint packings having adjacent lamina of differing swelling characteristics, the steps consisting in forming two stocks of artificial plastic composition for said lamina, each including an extraneous compatible heat convertible binder substantially inert to swelling and at least one of said stocks including a material having the property of swelling upon imbibition of a solvent encountered in service, positioning said stocks in face to face contact in a mold and bonding the body ingredients of each layer and integrally joining the layers by conversion of said inert binder upon the application of heat and pressure.

7. In the method of forming composite joint packings having adjacent lamina of differing swelling factors, the steps consisting in forming two stocks of artificial plastic composition, each including an extraneous compatible heat convertible binder substantially inert to swelling, partially curing each of said stocks to predetermined shape, placing such stocks in juxtaposition in a mold and curing such stocks by conversion of said inert binder upon the application of heat and pressure to bond the body ingredients of each layer and integrally join the layers into a body having predetermined laminated areas.

8. A composite packing, such as a cup washer or the like, which is made of a layer of an artificial material which has some elasticity and which includes a body material which will swell when in contact with a solvent without disintegrating and which will be exposed to the action of such solvent in use joined integrally to a second layer having substantially the same physical characteristics but less tendency to swell when in contact with the solvent and which will engage the surface to be sealed when in use, and an extraneous heat convertible binder inert to the action of the solvent bonding the body ingredients of each layer and joining the layers together against separation upon differential swelling of the layers, said second layer including a greater volume of said inert binder than the other layer.

9. A composite packing having a substantially cylindrical sealing surface for engagement with a corresponding surface to be sealed when in use, said sealing surface being formed on a layer of an artificial material which has some elasticity and which includes a body material which will swell when in contact with a solvent without disintegrating, and a backing layer integrally joined to the sealing layer and having physical characteristics similar thereto but a substantially greater tendency to swell when in contact with the solvent, a plurality of closely spaced ribs having greater length than width forming the exposed surface of said backing layer adjacent the cylindrical sealing surface and extending substantially parallel to the axis thereof.

10. A composite packing comprising a backing layer and a sealing layer each formed of artificial material, said layers being integrally joined together, said backing layer including a body material which will swell when in contact with a solvent without disintegrating and which will be exposed to the action of such solvent in use, the sealing layer having substantially the same physical characteristics as the backing layer but less tendency to swell when in contact with the solvent and having formed thereon a cylindrical sealing surface which will engage a corresponding surface to be sealed when in use, an extraneous binder inert to the action of the solvent bonding the body ingredients of each layer and joining the layers together against separation upon differential swelling of the layers, and a plurality of closely spaced ribs formed in the backing layer and extending substantially parallel to the axis of the cylindrical sealing surface of the sealing layer.

11. A composite packing comprising a sealing layer and a backing layer each formed of artificial material which has some elasticity and which includes a body material which will swell when in contact with a solvent without disintegrating, said layers being integrally joined together, an extraneous binder inert to the action of the solvent bonding the body ingredients of each layer and joining the layers together against separation upon differential swelling of the layers, the sealing layer including a greater volume of said binder than said backing layer whereby said backing layer will have a greater tendency to swell than said sealing layer upon action of such solvent, a substantially cylindrical sealing surface on said sealing layer for engagement with a corresponding surface to be sealed when in use, and a plurality of closely spaced ribs formed in the backing layer and extending substantially parallel to the axis of the cylindrical sealing surface of the sealing layer to bias the sealing surface into engagement with the surface to be sealed upon differential swelling in the sealing and backing layers.

12. An oil seal comprising a substantially cylindrical body portion and a radially directed flange, said body portion comprising a relatively thin sealing layer having a substantially cylindrical sealing surface, said layer being formed of an elastic, plastic composition including a material which will swell without disintegration when in contact with a solvent encountered in use, and a plurality of closely spaced ribs of elastic, plastic composition similar to that of the sealing layer and having a substantially greater tendency to swell when in contact with the solvent than said sealing layer, integrally joined to the sealing layer and extending substantially parallel to the axis of the sealing surface to bias the sealing surface into engagement with the surface to be sealed upon lengththening of the ribs upon swelling of the composition of which they are formed.

13. A composite packing comprising a sealing layer and a backing layer each formed of artificial material, said layers being securely united together, said sealing layer including an elastic body material and having a substantial cylindrical sealing surface for engagement with a corresponding surface to be sealed when in use, the sealing layer having a reduced thickness in the zone of the terminal edge thereof, the backing layer including an elastic body material which will swell without disintegrating when in contact with a solvent to bias the sealing layer into engagement with the surface to be sealed upon swelling of said backing layer, and a plurality of closely spaced ribs formed in the backing layer adjacent the sealing surface of the sealing layer and extending substantially parallel to the axis of the sealing surface to a point closely adjacent said terminal edge of the sealing surface to bias the edge portion of reduced thickness into engagement with the surface to be sealed.

14. A composite packing comprising a sealing layer and a backing layer each formed of artificial material, said layers being securely united together, said sealing layer including an elastic body material and having a substantially cylindrical sealing surface for engagement with a corresponding surface to be sealed when in use, the backing layer including an elastic body material which will swell without disintegrating when in contact with a solvent to bias the sealing layer into engagement with the surface to be sealed upon sealing of said backing layer, and a plurality of closely spaced ribs of substantially greater length than width formed in said backing layer adjacent the sealing surface of said sealing layer and extending throughout a substantial portion of the thickness of the backing layer substantially parallel to the axis of the sealing surface to enhance the biasing action in the sealing zone.

RALPH M. HILL.

REFERENCES CITED

The following references are of record in the file of this patent:

UNITED STATES PATENTS

| Number | Name | Date |
|---|---|---|
| 2,052,603 | Christenson | Sept. 1, 1936 |
| 1,788,414 | Stevenson | Jan. 13, 1931 |
| 1,409,276 | Benjamin | Mar. 14, 1922 |
| 2,008,682 | Christenson | July 23, 1935 |
| 1,931,922 | Damsel et al. | Oct. 24, 1933 |
| 524,162 | Cochrane | Aug. 7, 1894 |
| 1,673,239 | Groff | June 12, 1938 |

FOREIGN PATENTS

| Number | Country | Date |
|---|---|---|
| 518,557 | Great Britain | Feb. 29, 1940 |